US007993196B2

(12) United States Patent
Pacey et al.

(10) Patent No.: US 7,993,196 B2
(45) Date of Patent: Aug. 9, 2011

(54) WAGERING GAME WITH SYMBOL STRINGS DICTATING WINNING OUTCOMES

(75) Inventors: Larry J. Pacey, Northbrook, IL (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 283 days.

(21) Appl. No.: 12/087,948

(22) PCT Filed: Jan. 19, 2007

(86) PCT No.: PCT/US2007/001650

§ 371 (c)(1),
(2), (4) Date: Jul. 17, 2008

(87) PCT Pub. No.: WO2007/084766

PCT Pub. Date: Jul. 26, 2007

(65) Prior Publication Data

US 2009/0082087 A1 Mar. 26, 2009

Related U.S. Application Data

(60) Provisional application No. 60/760,582, filed on Jan. 20, 2006.

(51) Int. Cl.
*A63F 13/00* (2006.01)
*A63F 13/10* (2006.01)

(52) U.S. Cl. ........... 463/20; 463/16; 463/22; 273/138.1; 273/139; 273/243

(58) Field of Classification Search .............. 463/10–13, 463/16, 21–22, 25, 29, 40–42, 20; 273/138.1, 273/139, 142 B, 142 A, 142 J, 148 A, 149 P, 273/149 R, 243, 293, 304, 306, 309; *A63F 13/00, 13/10*

See application file for complete search history.

(56) References Cited

U.S. PATENT DOCUMENTS

| | | | | |
|---|---|---|---|---|
| 4,099,722 | A | 7/1978 | Rodesch et al. | |
| 4,200,291 | A | 4/1980 | Hooker | |
| 4,636,951 | A | 1/1987 | Harlick | |
| RE34,244 | E | 5/1993 | Hagiwara | |
| 5,423,539 | A * | 6/1995 | Nagao | 463/20 |
| 5,564,700 | A | 10/1996 | Celona | |

(Continued)

FOREIGN PATENT DOCUMENTS

EP 0 058 488 A1 8/1982

(Continued)

OTHER PUBLICATIONS

International Preliminary Examination Report—PCT/US07/01650 dated Nov. 23, 2008.

(Continued)

*Primary Examiner* — Arthur O. Hall
(74) *Attorney, Agent, or Firm* — Nixon Peabody LLP

(57) ABSTRACT

A gaming machine and method for conducting a wagering game includes at least one string of symbols for indicating an outcome of the wagering game wherein additional symbols are introduced into the string of symbols to produce winning combinations of symbols. Upon achieving a winning combination, the winning combination is removed from the string of symbols and the remaining symbols move together to form another string of symbols. The process is repeated and subsequent strings of symbols are evaluated for additional winning combinations.

22 Claims, 6 Drawing Sheets

U.S. PATENT DOCUMENTS

| | | | | |
|---|---|---|---|---|
| 5,704,835 | A | 1/1998 | Dietz, II | |
| 5,720,662 | A | 2/1998 | Holmes, Jr. et al. | |
| 5,769,716 | A | 6/1998 | Saffari et al. | |
| 5,807,172 | A | 9/1998 | Piechowiak | |
| 5,951,397 | A | 9/1999 | Dickinson | |
| 5,976,016 | A * | 11/1999 | Moody et al. | 463/13 |
| 5,980,384 | A | 11/1999 | Barrie | |
| 6,089,977 | A | 7/2000 | Bennett | |
| 6,117,013 | A | 9/2000 | Eiba | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,409,602 | B1 | 6/2002 | Wiltshire et al. | |
| 6,419,579 | B1 | 7/2002 | Bennett | |
| 6,481,715 | B1 * | 11/2002 | Callan | 273/237 |
| 6,551,187 | B1 * | 4/2003 | Jaffe | 463/20 |
| 6,632,140 | B2 * | 10/2003 | Berman et al. | 463/18 |
| 6,855,054 | B2 | 2/2005 | White et al. | |
| 6,960,133 | B1 * | 11/2005 | Marks et al. | 463/20 |
| 7,090,579 | B2 * | 8/2006 | Tarantino | 463/20 |
| 7,371,170 | B2 * | 5/2008 | Cregan et al. | 463/20 |
| 7,526,736 | B2 * | 4/2009 | Kaminkow et al. | 715/839 |
| 7,534,168 | B2 * | 5/2009 | Bennett et al. | 463/20 |
| 7,553,231 | B2 * | 6/2009 | Rodgers et al. | 463/20 |
| 7,559,837 | B1 * | 7/2009 | Yoseloff et al. | 463/21 |
| 7,585,219 | B2 * | 9/2009 | Randall et al. | 463/20 |
| 7,654,895 | B2 * | 2/2010 | Pacey | 463/16 |
| 7,674,176 | B2 * | 3/2010 | Berman et al. | 463/20 |
| 7,749,063 | B2 * | 7/2010 | Belger et al. | 463/16 |
| 7,758,414 | B1 * | 7/2010 | Marks et al. | 463/20 |
| 7,841,936 | B2 * | 11/2010 | Berman et al. | 463/20 |
| 2002/0077165 | A1 | 6/2002 | Bansemer et al. | |
| 2003/0017867 | A1 | 1/2003 | deKeller | |
| 2003/0054874 | A1 | 3/2003 | Kaminkow | |
| 2003/0057645 | A1 | 3/2003 | Baerlocher et al. | |
| 2003/0060267 | A1 | 3/2003 | Glavich et al. | |
| 2003/0092480 | A1 * | 5/2003 | White et al. | 463/20 |
| 2003/0157981 | A1 * | 8/2003 | Marks et al. | 463/20 |
| 2004/0033829 | A1 * | 2/2004 | Pacey et al. | 463/20 |
| 2004/0043809 | A1 | 3/2004 | Gomez et al. | |
| 2004/0092300 | A1 * | 5/2004 | Gauselmann | 463/16 |
| 2006/0068873 | A1 * | 3/2006 | Gomez | 463/16 |
| 2007/0077976 | A1 * | 4/2007 | Jackson | 463/13 |

FOREIGN PATENT DOCUMENTS

| | | | |
|---|---|---|---|
| EP | 1 063 622 | A2 | 12/2000 |
| GB | 1 454 046 | A | 10/1976 |
| GB | 2 062 922 | A | 5/1981 |
| GB | 2 097 160 | A | 10/1982 |
| GB | 2 106 293 | A | 4/1983 |
| GB | 2 106 295 | A | 4/1983 |
| GB | 2 165 385 | A | 4/1986 |
| GB | 2 243 236 | A | 10/1991 |
| GB | 2 372 132 | A | 8/2002 |
| WO | WO 98/20949 | | 5/1998 |
| WO | WO 00/30727 | | 6/2000 |

OTHER PUBLICATIONS

Tetris Attack Instruction Booklet, US release date Sep. 1, 1996, 13 pages.

"Bejeweled" description and screen shots from zone.msn.com/bejeweled, printed Aug. 7, 2008.

Zuma, (released in Dec. 2003) as described in Wikipedia webpage.

* cited by examiner

WAGERING GAME WITH SYMBOL STRINGS DICTATING WINNING OUTCOMES

CROSS REFERENCE TO RELATED APPLICATIONS

This application is a U.S. national phase of International Application No. PCT/US2007/001650, filed Jan. 19, 2007, which claims the benefit of priority of U.S. Provisional Patent Application No. 60/760,582, filed Jan. 20, 2006, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a string of symbols for indicating a game outcome.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Other gaming enhancements that provide entertainment value to the player include offering new and different ways of achieving winning outcomes based on player interaction with the wagering game. Such new and different ways of achieving winning outcomes attract players and may further enhance player loyalty.

SUMMARY OF THE INVENTION

According to one aspect of the present invention, a gaming machine for conducting a wagering game includes a display for displaying a wagering game having a plurality of symbols that indicate a randomly selected outcome selected from a plurality of outcomes in response to receiving a wager input from a player. The plurality of symbols includes a first string of symbols. The gaming machine also includes a symbol-input device providing an introduction of at least one additional symbol into the first string of symbols. The introduction of the at least one additional symbol creates a winning portion of the first string of symbols to indicate a first winning outcome having an associated award.

According to another aspect of the invention, a method of conducting a wagering game on a gaming machine comprises receiving a wager input from a player, displaying a string of symbols from a plurality of symbols and introducing at least a first symbol into the string of symbols. The method further comprises achieving a first winning outcome associated with the at least first symbol being introduced into the string of symbols and awarding a player an award based on the first winning outcome.

According to yet another aspect of the invention, a computer readable storage medium is encoded with instructions for directing a gaming device to perform the above method.

According to a further aspect of the invention, a gaming machine for playing a wagering game comprises a display for displaying a plurality of symbols that indicate a randomly selected outcome of the wagering game. The plurality of symbols includes a string of symbols. The gaming machine further comprises a controller coupled to the display. The controller is operative to introduce at least one additional symbol into the string of symbols to produce a modified string of symbols, evaluate the modified string of symbols to determine whether a winning combination of symbols has been achieved, provide an award for the winning combination of symbols achieved, eliminate the winning combination of symbols from the modified string of symbols, and after the elimination, evaluate subsequent strings of symbols for possible winning combinations.

Additional aspects of the invention will be apparent to those of ordinary skill in the art in view of the detailed description of various embodiments, which is made with reference to the drawings, a brief description of which is provided below.

DETAILED DESCRIPTION

Figure 1:
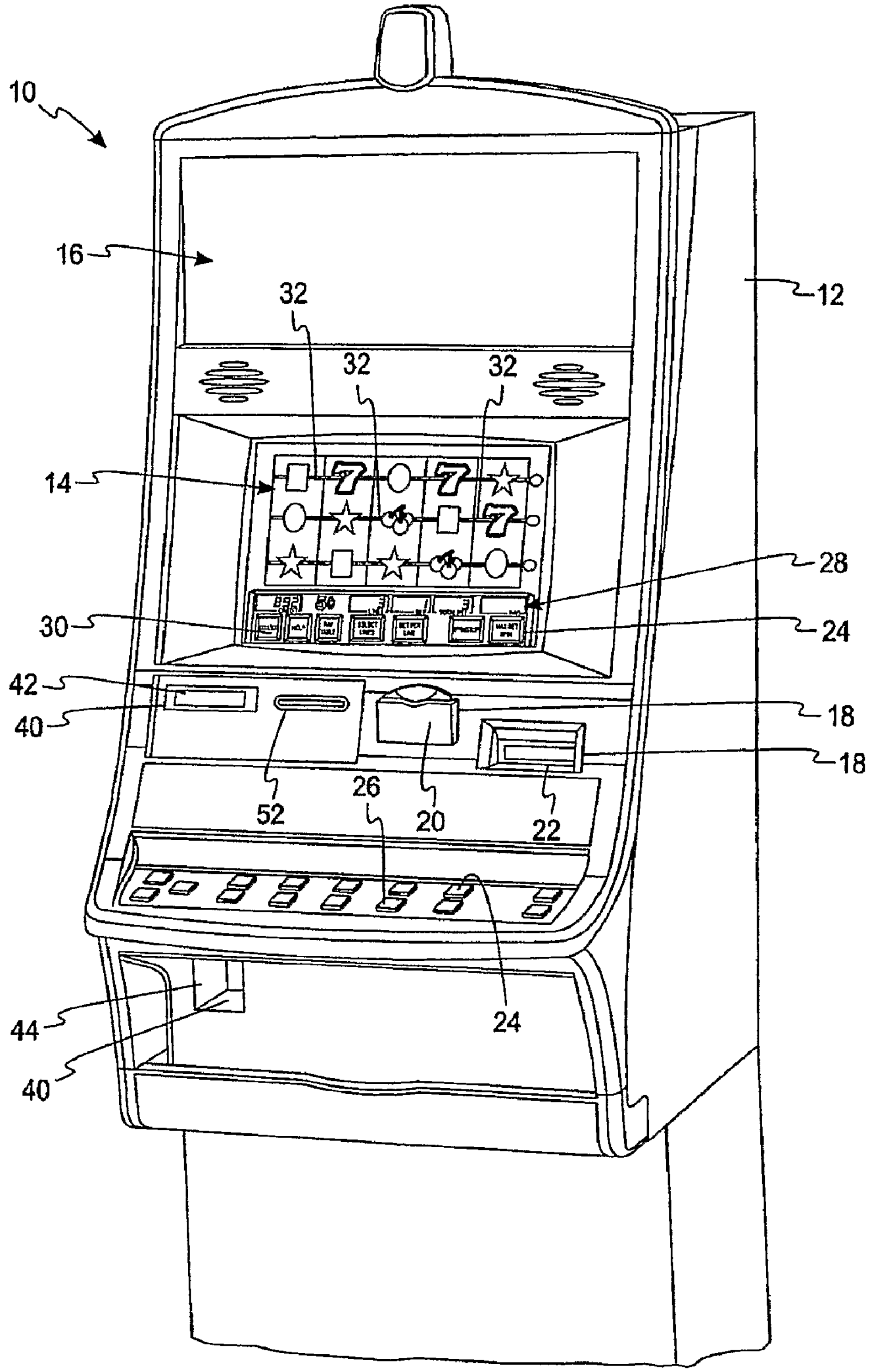
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
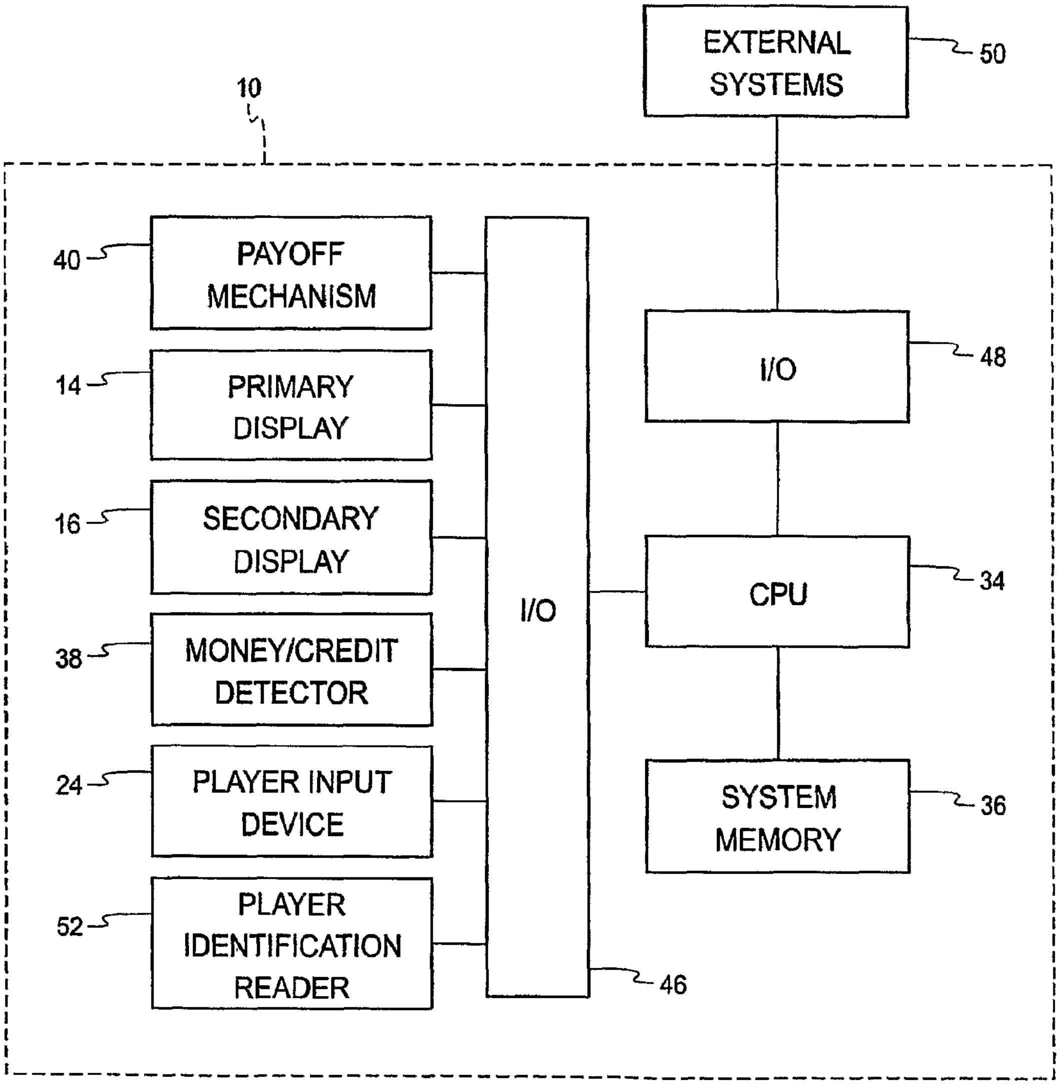
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
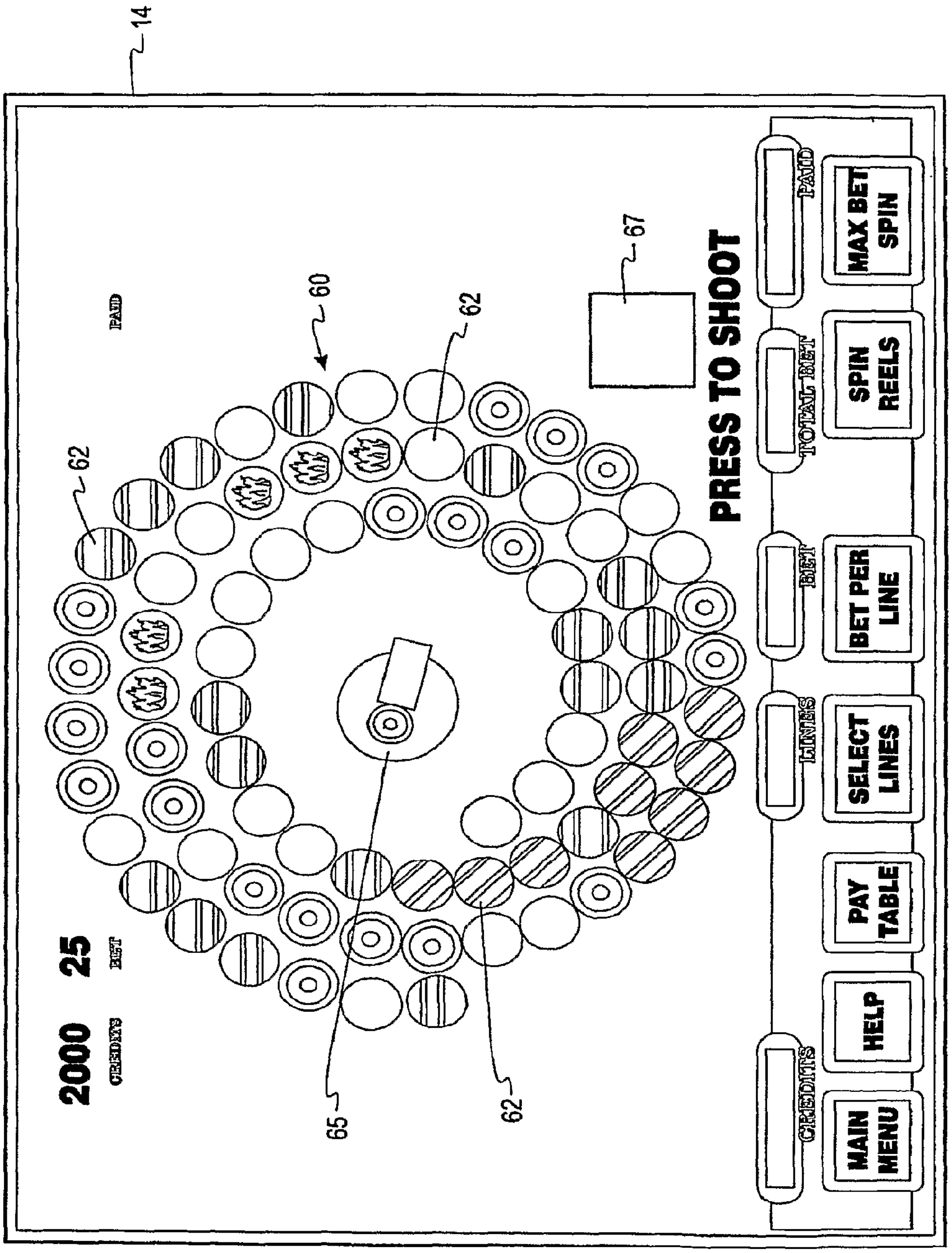
FIG. 3 is a primary display of the gaming machine of FIG. 1 displaying a wagering game having a string of symbols for indicating a game outcome.

The primary display 14 of one embodiment of the present invention is shown in more detail in FIG. 3. In this embodiment, the basic wagering game includes a string of symbols 60 made up of a plurality of individual symbols 62. The plurality of individual symbols 62 may include symbols having different designs, shapes, patterns, etc. To make up the string of symbols 60, the plurality of individual symbols 62 may be arranged in various forms. In one embodiment, as shown in FIG. 3, the string of symbols 60 is a circular spiral having an inner row, a middle row, and an outer row of symbols. The string of symbols 60 may take other forms in addition to the circular spiral shown in FIG. 3, such as a square, a rectangle, a triangle, a grid where symbols may be on any line or in a cluster, a spiral with multiple levels, etc. As with the circular spiral of FIG. 3, the other forms listed above may have multiple rows of symbols. With any of the forms described herein, the plurality of individual symbols 62 in the string of symbols 60 may be distributed either randomly or intentionally.

Also shown in FIG. 3 is a symbol-input device 65, such as a "gun," for introducing additional symbols into the string of symbols 60. The symbol-input device 65 may be located inside of the string of symbols 60 (as shown in FIG. 3) or outside of the string of symbols 60. In some embodiments, if the symbol-input device 65 is located outside of the string of symbols 60, an extra award may be located inside the string of symbols 60. The player may be awarded the extra award if he or she is able to pass a discharged symbol from the symbol-input device 65 through the string of symbols 60 to reach to the extra award. The same type of extra award could also be established outside the string of symbols 60 in FIG. 3, such that the player achieves the extra award if he or she is able to pass a discharged symbol from the symbol-input device 65 outwardly through the string of symbols 60 to reach the extra award.

The symbol-input device 65 may be operated by the controller 34 or may be at least partially operated by the player. For example, the player may be able to control where the symbol-input device 65 "shoots" a discharged symbol into the string of symbols 60, or the player may be able to view the type of symbols and decide which symbol type is introduced into the string of symbols or decide which symbol type gets introduced into the string of symbols without viewing the symbol, or any combination of these scenarios. The player may operate the symbol-input device 65 by pressing the "Press to Shoot" button 67 shown on the primary display 14 or by pressing other buttons 26 on the player input device 24 or the touch screen keys 30.

Figure 4:
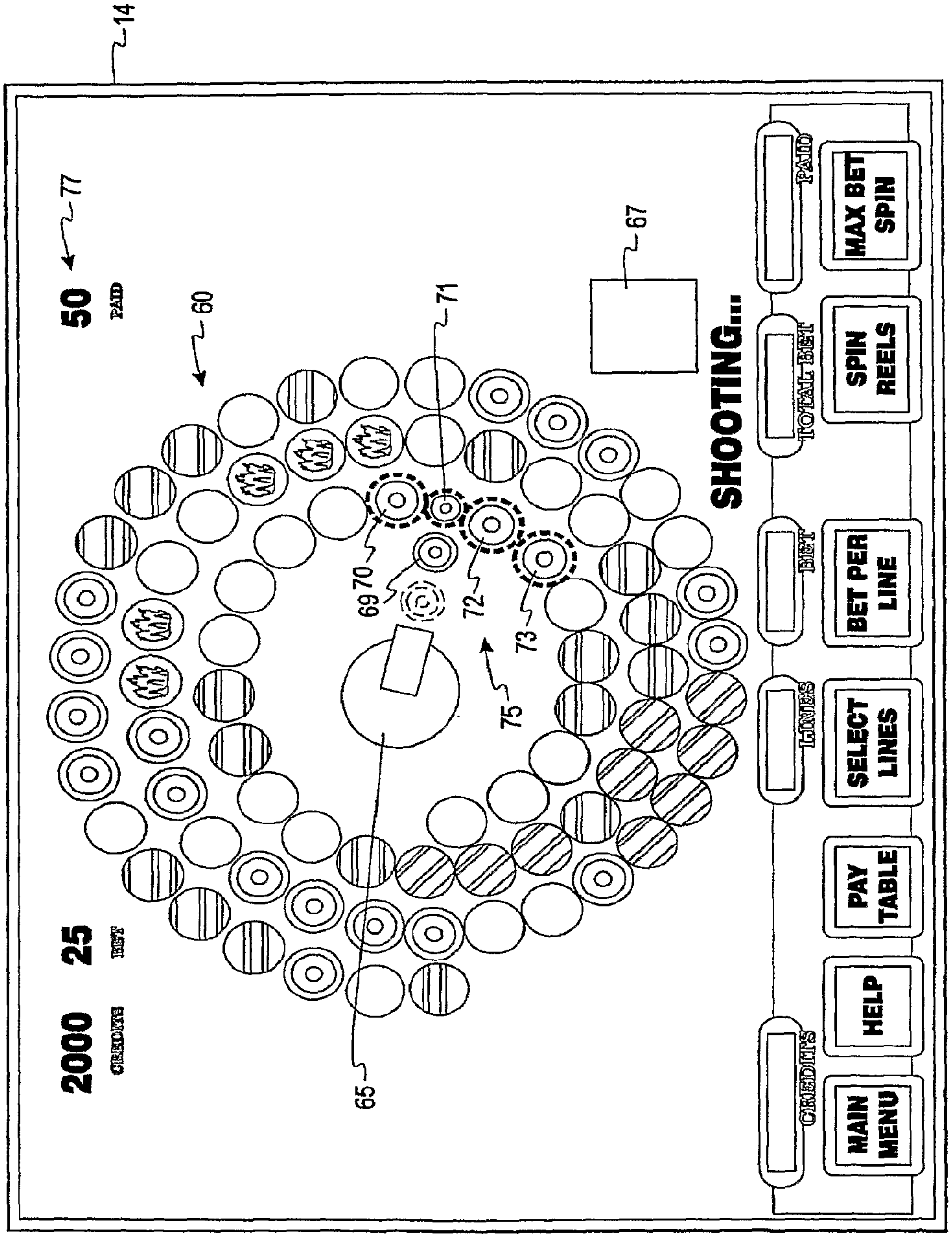
FIG. 4 is a primary display of the gaming machine of FIG. 1 displaying a wagering game having a symbol being introduced into a string of symbols.

As shown in FIG. 4, the symbol-input device 65 introduces a new symbol 69 into the string of symbols 60 at which time the controller 34 evaluates the string of symbols 60 containing the new symbol 69. If the new symbol 69 is introduced into the string of symbols 60 at a location having other symbols that match the new symbol 69, then the portion of matching symbols that includes new symbol 69 achieves a winning combination of symbols, such as symbols 69, 70, 71, 72, 73 in FIG. 4. This first winning portion of symbols 75 (indicated with dotted lines) satisfies at least one of the paying conditions of the wagering game, i.e., three or more of the same consecutive symbols, and the player is awarded a payout 77 associated with the winning outcome. For example, as shown in FIG. 4, the player is awarded 50 credits for achieving five like symbols 69-73 in a row. Other paying conditions can include achieving three or more similar or related symbols or other sets of symbols that fulfill a winning condition. In some embodiments, the player may be able to introduce additional symbols until the first winning outcome is achieved, guaranteeing at least one winning outcome for the player.

Figure 5:
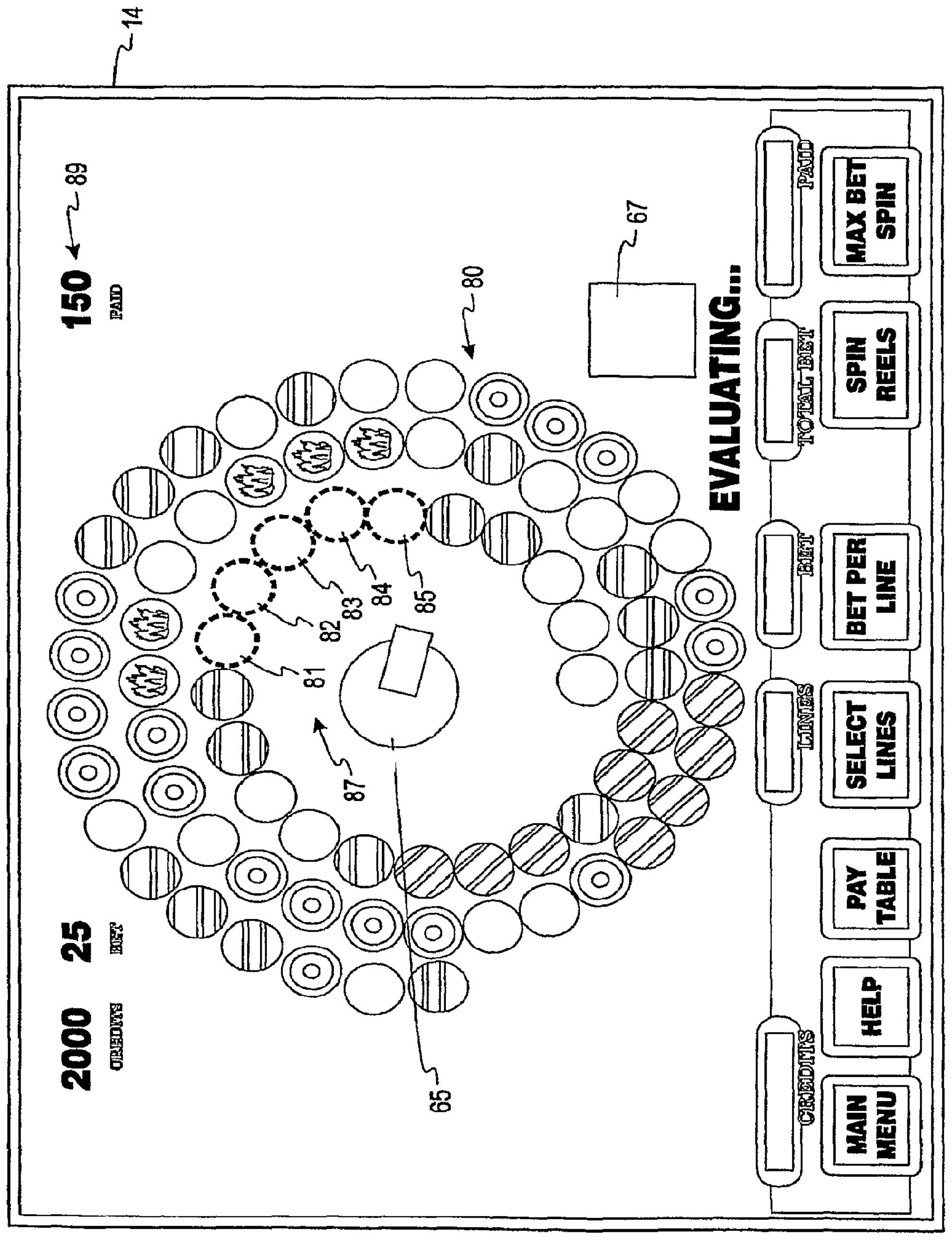
FIG. 5 is a primary display of the gaming machine of FIG. 1 displaying a wagering game having a plurality of the same symbols in a first portion of a string of symbols.

In some embodiments, after the player is awarded the associated payout 77, the first winning portion of symbols 75 is removed or eliminated from the string of symbols 60. As shown in FIG. 5, the remaining symbols of the string of symbols 60 move together at the area where the first winning portion of symbols 75 was removed. The string of symbols 60 is then reformed into a second string of symbols 80 with the leading end of the second string of symbols 80 (i.e., the leading six symbols on the inner row that were separated from the main symbol string 60 of FIG. 3 due to the first winning portion of symbols 75 being removed). In some embodiments, if the symbols that moved together achieve a winning combination of symbols, then the player may be awarded another payout. For example, as shown in FIG. 5, symbols 81, 82, 83, 84, 85 move together to form a second winning portion of symbols 87. The player is awarded another payout 89 associated with the second winning portion of symbols 87.

In some embodiments, the string of symbols 60 may be refilled or replenished such that new symbols take the place of the winning portions of symbols that are removed. In some embodiments, the refilling or replenishing may occur based on the occurrence of various events, such as after portions of the symbols are removed as described above, after a certain time period, i.e., after 5 minutes of game play, or after a player achieves a certain level of game play based on, for example, the player's winnings. After achieving a certain level, the difficulty of clearing all of the symbols may increase which may also lead to larger payouts based on the level of game play.

Figure 6:
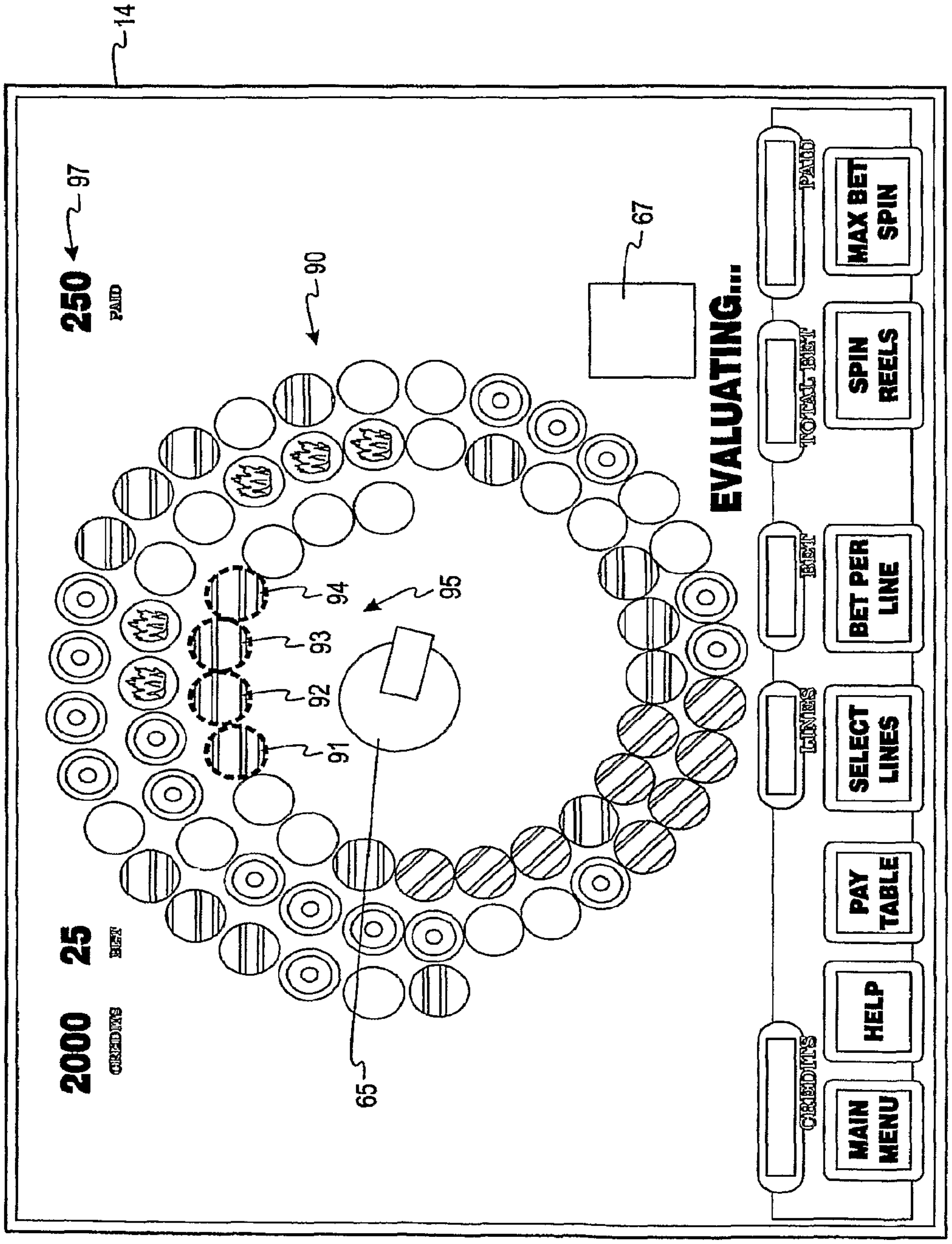
FIG. 6 is a primary display of the gaming machine of FIG. 1 displaying a wagering game having a plurality of the same symbols in a second portion of a string of symbols.

After the player is awarded payout 89, the second winning portion of symbols 87 is removed from the second string of symbols 80. As shown in FIG. 6, the remaining symbols of the second string of symbols 80 move together at the area where the second winning portion of symbols 87, was removed (i.e., the lading end of the second string of symbols 80 is retracted in a counterclockwise fashion). As such, the second string of symbols 80 is then reformed into a third string of symbols 90. The process may continue as described above, wherein upon evaluation by the controller 34, the third string of symbols 90 may form another winning combination of symbols. For example, as shown in FIG. 6, the symbols 91, 92, 93, 94 move together to form a third winning portion of symbols 95. The player is awarded another payout 97 associated with the third winning portion of symbols 95.

In some embodiments, if after removing the third winning portion of symbols 95, the symbols move together and fail to achieve a winning combination of symbols, then the string of symbols 90 does not collapse again. At this point, the game may be terminated when no further winning combinations can be achieved. Additionally or alternatively, the controller or player may be allowed to introduce additional symbols into the string of symbols 90 to continue play of the wagering game. After introducing additional symbols, the same process as described above for evaluating the string of symbols for winning combinations may be repeated. In some embodiments, the player may only be allowed a certain number of non-winning combinations of symbols before the game is terminated.

It is contemplated that many different variations of the wagering game described herein are possible and can be included in any of the embodiments described above. For example, there may be more than one symbol-input device 65 for introducing symbols into the string of symbols 60, both or either of which may be at least partially controlled by the player. In addition to having multiple symbol-input devices 65, there may be more than one string of symbols 60 in which to introduce symbols and achieve winning combinations. For example, there may be two or more circular spirals on a primary display 14, wherein one or more of the symbol-input devices 65 can introduce at least one additional symbol into either one or both of the two or more circular spirals. Additionally, one symbol-input device 65 may be able to introduce a symbol into a first row or line of the string of symbols 60 and another symbol-input device 65 may be able to introduce a symbol into a second row or line of the string of symbols 60.

In other embodiments, the player may be allowed only once to introduce a symbol into the string of symbols 60 or may be allowed multiple times to enter additional symbols. This may depend on the player's wager. For example, the more a player wagers, the more "shots" he or she will have at introducing additional symbols. Additionally or alternatively, the availability of certain symbols may be based on the player's wager amount, similar to wagering games wherein a player is allowed to "buy-a-play." Also, a player may be able to place an additional wager to be able to view the next symbol to be introduced into the string of symbols 60 from the symbol-input device 65. This may create a heightened sense of anticipation as the player knows that a certain winning combination is possible. Additionally, the player may be able to choose which symbol is introduced into the string of symbols 60, thereby giving the player more control (and expected winnings) over the game outcome.

In other embodiments, multiple rows or lines of symbols that make up the string of symbols may form barriers that a player must get through to achieve winning combinations of symbols that are associated with larger payouts, bonus games, multipliers, etc. In some embodiments, the rows or lines may not always move together to reform the string of symbols 60, but instead may leave holes or gaps in the string of symbols 60 so that the player can shoot through the holes or gaps to get to additional rows or lines of symbols. Additionally or alternatively, the winning portions of symbols that are removed from the string of symbols 60 may be replenished such that new symbols take the place of the winning portions of symbols that are removed.

In some embodiments, the string of symbols 60 may include special symbols that are associated with special functions. The special symbols are desirable as they offer additional chances for achieving winning combinations and associated payouts. For example, some symbols may turn any symbols that they touch into matching symbols. Additionally, some symbols, when introduced from the symbol-input device 65, may affect not only the first row or line that they come into contact with, but they may also affect other rows or lines located in close proximity to the first row or line. For example, a symbol introduced into a first row of a string of symbols 60 may result in a winning combination of symbols in the first row symbols and may also result in winning combinations in the second or third rows of symbols. Alternatively, only the last row that the symbol reaches may produce a winning combination.

Other special symbols may include symbols that remove all matching symbols, whether or not the symbols directly touch the matching symbols or not. Additionally, some symbols that do not complete a winning combination may either join the string of symbols 60 or may be removed before joining occurs. Furthermore, some symbols may not appear until after the symbol has been "shot" from the symbol-input device. Additionally or alternatively, some symbols may even change position once they have been introduced into the string of symbols 60.

In further embodiments, the amount of the payout associated with a winning combination may depend on the number of like symbols achieved or the total number of symbols removed from the string of symbols 60. For example, a player may receive a larger payout for achieving or removing a winning portion of symbols containing five symbols compared with the payout for achieving or removing a winning portion of symbols containing only three symbols. In some wagering games, a multiplier may be applied to the payout to increase the amount of the payout awarded to the player. The multiplier may be based on the number of "cascades" achieved during game play, i.e., the number of times the string of symbols 60 is reformed after removing winning portions of symbols. Additionally, the multiplier may be based on other criteria such as the appearance of a certain symbol or the number of symbols remaining after the wagering game is terminated. In some embodiments, a player may receive an extra payout, bonus game, multiplier, etc. for removing all of the symbols from the primary display 14. In yet further embodiments, some payouts may be progressive payouts that increase from game to game.

Also contemplated by embodiments of the present invention and described above is the ability of the player to have at least some control of the introduction of a particular symbol and the placement of the symbol. Alternatively, the introduction or placement of the symbol is random and performed entirely by the controller 34.

Additionally, the string of symbols 60 may be static or moving. With respect to FIGS. 3 to 6, the string of symbols may be moving in a clockwise direction such that the leading end of the string of symbols 60 moves closer (in a circular pattern) to the symbol-input device 65. In some embodiments, if the lead symbol of the string of symbols 60 reaches the symbol-input device 65, then the game is ended and the player may or may not receive an additional award for reaching the symbol-input device 65. When the string of symbols 60 is moving, there may be some uncertainty as to where the placement of a symbol into the string of symbols 60 may occur. This may offer players more entertainment value and perhaps larger payouts for achieving winning combinations of symbols.

Additionally or alternatively, the player may be allowed to save the status of the wagering game to play at a later gaming session or at a different gaming machine 10. Thus, when returning to a gaming machine 10, the player may be able to decide between playing a wagering game having an entirely new string of symbols or playing a wagering game that was previously saved and then recalled so that a player can continue playing a prior wagering game.

Furthermore, as the present invention is described in terms of the basic wagering game, it is also contemplated that the present invention may be used in a bonus game setting. For example, upon achieving a start-bonus-outcome in the basic wagering game, a player may be given a chance at a bonus game wherein symbols are introduced into a string of symbols 60 on the primary display 15 or the secondary display 16 to achieve a winning combination. The random outcome of the basic game may result in variations to the bonus game having the string of symbols 60. For example, certain random outcomes or events (or wager inputs) in the basic game may result in (i) a different number of "shots" from the symbol-input device 65, (ii) a different number of symbol types in the string of symbols 60 (i.e., less symbol types makes same-symbol combinations more likely), (iii) different speed of movement (or non-movement) of the string of symbols 60, (iv) different directional movement of the string of symbols 60 (clockwise or counter-clockwise), (v) the ability to view the current symbol type that will be discharged from the symbol-input device 65, (vi) the ability to view the to-be-discharged current symbol types that will be discharged from the symbol-input device 65 after the current symbol is discharged, (vii) a players symbol-selection option to allow the player to select which symbol type will be discharged form the symbol-input device 65, (viii) the introduction of "special" symbols to the string of symbols 60, or (ix) the introduction of "special" symbols to be discharged from the symbol-input device 65.

In addition to the embodiments including the bonus games described above, the gaming machine 10 may include the basic wagering game having a set of reels and the bonus or secondary game having the string of symbols 60 and a symbol-input device 65. In one example, if, during play of the basic wagering game, a symbol lands in a certain position on the set of reels, the symbol landing in the certain position may be placed into the symbol-input device 65 that is displayed in the bonus or secondary game. If this occurs, play of the basic wagering game may be suspended until the symbol is introduced (via the player or the controller 34 as described herein) into the string of symbols 60 to achieve a winning combination. In other embodiments, the bonus or secondary game may not begin until the player has finished all plays of the basic wagering game. The state of the string of symbols 60 in the bonus or secondary game may be held from game to game such that the location and occurrence of symbols in the string remains fixed or the string of symbols 60 may be rejuvenated after each game. In such embodiments, the bonus or secondary game may be displayed on either the main display 14 or secondary display 16.

Additionally, the gaming machine 10 of the embodiments of the present invention may include a computer readable storage medium encoded with instructions for directing a gaming device to perform the methods of playing the wagering game described herein.

With respect to embodiments of the present invention, it is preferred to have player skill removed during game play to help meet regulatory approval. One option for accomplishing this is to remove player input and to have the introduction of the symbols by the symbol-input device 65 completely controlled by the controller 34. In this scenario, the player has no input over the type of symbol discharged or the placement of the symbol as it is being introduced into the string of symbols 60. As such, the likelihood of achieving game outcomes is the same for everyone.

On the other hand, it is preferable to allow some player control over the outcome of the wagering game, but insure that the expected value of the wagering game is the same for all players. One way to accomplish this is to have partial player control over the outcome of the wagering game but to allow for a mystery prize that can be awarded to any lesser-skilled players that makes up for any advantage a player might have if he or she has more skill in playing the wagering game. This insures that players with different skill levels will have the same expected value when playing the wagering game.

For example, a skilled player may introduce a symbol into the string of symbols 60 such that the player receives a maximum award of 100 credits. A lesser-skilled player may introduce a symbol in the string of symbols 60 such that the player receives an award of only 20 credits. However, in addition to achieving an award of 20 credits, the lesser-skilled player may also receive an award associated with a mystery event. One such mystery event may include associating a mystery award with one of the symbols of the moving string of symbols 60 that reaches the symbol-input device 65. The mystery award associated with this mystery event may equal 80 credits. Thus, in this scenario, even though the gaming machine 10 allows the player to have some control over the outcome of the wagering game (which may give some players less of an advantage when compared with other players), the gaming machine 10 also may award additional awards when a player receives an award less than the expected value.

Other scenarios may include allowing players to have partial control based on random "picking" of symbols by players. For example, a wagering game may allow a player to pick one of three boxes containing hidden symbols that will be discharged from the symbol-input device 65. The symbols from the selected box are then revealed and are randomly introduced, one at a time, into the string of symbols 60 by the controller 34. The symbols are introduced in a certain order and location into the string of symbols 60 such that a player receives a certain award, for example 130 credits. This award is predetermined once the player picks the one box from the three player-selectable boxes (i.e., the other player-selectable boxes would have produced 150 credits or 110 credits had the player chosen them). Even though another player may pick another box and get a higher or lower credit award, the expected value is the same for each player due to the randomness of the player's picks. The present invention contemplates a wagering game having many player-selectable boxes (e.g. 10 boxes) having different numbers and different types of hidden symbols (i.e. different "Ammunition Boxes"), resulting in a wide range of possible awards (and player experiences) that occur in one string of symbols.

However, if in the scenario just described, the player has some control over, for example, the order of the symbols or the introduction of the symbols into the string of symbols 60 after the box of symbols has been picked, then players having more skill will have better chances of winning greater awards over those who have less skill. To make the expected value the same for both players when player inputs are used, the gaming machine 10 may provide an award based on a mystery event. The mystery event may include awarding an award for reaching the symbol-input device 65 as described above or any other event such as having a "special" symbol from one of the symbols in the chosen box of symbols be associated with an extra award. This mystery event and associated award insure that two players having different skill levels will be able to achieve the same results when playing the wagering game. Yet, the excitement related to the introduction of the symbols via player inputs is still achieved.

Each of these embodiments and obvious variations thereof is contemplated as falling within the spirit and scope of the claimed invention, which is set forth in the following claims.

What is claimed is:

1. A gaming system comprising:

at least one display that displays a wagering game having a plurality of symbols that indicate a randomly selected outcome selected from a plurality of outcomes in response to receiving a wager input from a player, said plurality of symbols comprising a sequentially-connected first string of symbols having a payline extending along said first string;

at least one processor configured to introduce, via said at least one display, at least one additional symbol into said first string of symbols;

evaluate said first string for a winning symbol combination including said at least one additional symbol;

in response to said winning symbol combination occurring in said first string, remove said winning symbol combination from said first string and reconnect any symbols that were previously connected to said removed combination to form a sequentially-connected second string of symbols; and award said player an award based on said winning symbol combination.

2. The gaming system of claim 1, wherein said at least one additional symbol is introduced into said first string via a visual symbol-input device displayed via said at least one display.

3. The gaming system of claim 2, wherein said at least one additional symbol is revealed to said player prior to introducing said at least one additional symbol.

4. The gaming system of claim 2, wherein said introducing of said at least one additional symbol via said symbol-input device is controlled by said player.

5. The gaming system of claim 2, wherein said introducing of said at least one additional symbol via said symbol-input device is controlled by a controller.

6. The gaming system of claim 1, further comprising, upon forming said second string of symbols, evaluating said second string for another winning symbol combination that includes at least one of said reconnected symbols.

7. The gaming system of claim 6, wherein said another winning symbol combination of said second string of symbols is removed from said second string of symbols such that said remaining symbols move together to form a sequentially-connected third string of symbols.

8. A method of conducting a wagering game via a gaming system, the method comprising:

accepting a wager from a player via an input device;

initiating said wagering game via one or more processors;

displaying, via at least one display device, a plurality of symbols sequentially connected to form a sequentially-connected first string of symbols having a payline extending along said first string;

introducing at least one additional symbol into said displayed first string;

evaluating said first string, via said one or more processors, along said payline for a first winning combination that includes said at least one additional symbol;

in response to said first winning combination occurring in said first string, removing said first winning combination from said first string and reconnecting any symbols that were previously connected to said removed combination to form a sequentially-connected second string of symbols;

evaluating said second string of symbols for a second winning combination that includes at least one of said reconnected symbols; and awarding said player an award based on at least said first winning combination.

9. The method of claim 8, further comprising introducing, via said one or more processors, a second additional symbol into said second string of symbols and achieving a second winning combination associated with said second additional symbol being introduced into said second string of symbols.

10. The method of claim 9, further comprising awarding an award based on said second winning combination.

11. The method of claim 8, wherein said at least one additional symbol is revealed to said player prior to introducing said at least one additional symbol.

12. The method of claim 11, wherein said player selects said at least one additional symbol from a plurality of available symbols prior to introducing said at least one additional symbol into said first string.

13. The method of claim 8, further comprising moving said first string of symbols while introducing said at least one additional symbol.

14. The method of claim 8, wherein said introducing said at least one additional symbol includes introducing further additional symbols until said winning combination is achieved.

15. The method of claim 8, wherein said winning combination includes a set of identical symbols, a set of related symbols or a set of symbols that fulfills a winning condition.

16. A gaming system for playing a wagering game, said system comprising:

at least one display that displays a plurality of symbols that indicate a randomly selected outcome of said wagering game, said plurality of symbols comprising a sequentially-connected first string of symbols having a payline extending along said first string; and a controller coupled to said at least one display and operative to control said at least one display to introduce at least one additional symbol into said first string, evaluate said first string of symbols for a winning combination that includes said at least one additional symbol, provide an award for said winning combination, eliminate said winning combination of symbols to expose underlying symbols in said first string, introduce a further additional symbol into said underlying symbols; and evaluate said underlying symbols for a winning combination that includes said further additional symbol.

17. The gaming machine of claim 16, further comprising an input device that receives input from a player related to introducing additional symbols, and wherein said controller is coupled to said input device.

18. The gaming machine of claim 17, wherein the player controls introducing said further additional symbol into said underlying symbols.

19. The gaming machine of claim 18, wherein said at least one additional symbol is revealed to said player prior to introducing said at least one additional symbol.

20. The gaming machine of claim 18, wherein said player can select said at least one additional symbol prior to introducing said at least one additional symbol.

21. The gaming machine of claim 16, wherein said controller is operative to terminate said wagering game in response to said further additional symbol producing no winning combination.

22. The gaming machine of claim 16, wherein said at least one display displays said first string of symbols as one of a spiral, multiple rows, and multiple columns.

* * * * *